US009701315B2

(12) United States Patent
Wuthnow et al.

(10) Patent No.: US 9,701,315 B2
(45) Date of Patent: Jul. 11, 2017

(54) CUSTOMIZED IN-VEHICLE DISPLAY INFORMATION

(71) Applicant: AT&T INTELLECTUAL PROPERTY I, L.P., Atlanta, GA (US)

(72) Inventors: Mark S. Wuthnow, Austin, TX (US); Randolph Wohlert, Austin, TX (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

(21) Appl. No.: 14/941,374

(22) Filed: Nov. 13, 2015

(65) Prior Publication Data
US 2017/0137032 A1   May 18, 2017

(51) Int. Cl.
*B60W 40/08* (2012.01)
*H04L 29/08* (2006.01)
(Continued)

(52) U.S. Cl.
CPC ........... *B60W 40/08* (2013.01); *G06Q 50/01* (2013.01); *H04L 67/306* (2013.01);
(Continued)

(58) Field of Classification Search
CPC .......... B60W 40/08; B60W 2040/0881; G06Q 50/01; H04M 1/72572; H04M 1/72527;
(Continued)

(56) References Cited

U.S. PATENT DOCUMENTS 7,126,583 B1   10/2006   Breed
8,350,686 B2   1/2013    Inoue
(Continued)

FOREIGN PATENT DOCUMENTS

CN     102745141 A    10/2012
EP       2913228 A1    9/2015
(Continued)

OTHER PUBLICATIONS

Ashe, S., "GM Explores Rear Windows as Entertainment Displays", CNet, cnet.com, Jan. 19, 2012, http://www.cnet.com/news/gm-explores-rear-windows-as-entertainment-displays/, 2 pp.
(Continued)

*Primary Examiner* — Michael J Zanelli
(74) *Attorney, Agent, or Firm* — Toler Law Group, PC

(57) ABSTRACT

A computer-implemented method includes determining, based on first information received from a first mobile device within a vehicle, that the first mobile device is associated with a first person. The method includes determining first in-vehicle display preference information and a first vehicle occupant position of a plurality of vehicle occupant positions for the first person. The method also includes selecting, based on the first vehicle occupant position, a first projector of a plurality of projectors within the vehicle. The method further includes providing data representing display information to the first projector to enable the first projector to project the display information onto a display associated with a first window of the vehicle. The display information is determined based on the first in-vehicle display preference information for the first person.

20 Claims, 5 Drawing Sheets

(51) Int. Cl.
*G06Q 50/00* (2012.01)
*H04M 1/725* (2006.01)

(52) U.S. Cl.
CPC ... *H04M 1/72527* (2013.01); *H04M 1/72569* (2013.01); *H04M 1/72572* (2013.01); *B60W 2040/0881* (2013.01)

(58) Field of Classification Search
CPC .. H04M 1/72569; H04L 67/306; G02B 27/01; B60K 2350/2052
See application file for complete search history.

(56) References Cited

U.S. PATENT DOCUMENTS

| | | | |
|---|---|---|---|
| 8,395,529 B2 | 3/2013 | Seder et al. | |
| 8,564,502 B2 | 10/2013 | Cui et al. | |
| 8,686,922 B2 | 4/2014 | Breed | |
| 8,831,585 B2* | 9/2014 | Nicholson | H04W 12/08 385/56 |
| 9,348,492 B1* | 5/2016 | Penilla | B60W 40/08 |
| 2005/0248503 A1 | 11/2005 | Schobben et al. | |
| 2009/0195652 A1 | 8/2009 | Gal | |
| 2011/0281519 A1* | 11/2011 | Reuss | H04W 8/005 455/41.2 |
| 2012/0006610 A1* | 1/2012 | Wallace | H04M 1/67 180/272 |
| 2013/0217331 A1* | 8/2013 | Manente | H04W 4/008 455/41.2 |
| 2014/0091989 A1 | 4/2014 | Szczerba et al. | |
| 2014/0244069 A1* | 8/2014 | Yang | B60R 16/0231 701/1 |
| 2014/0368540 A1 | 12/2014 | Iguchi | |
| 2015/0077272 A1* | 3/2015 | Pisz | B60K 37/06 340/905 |
| 2015/0077327 A1 | 3/2015 | Pisz et al. | |
| 2015/0175068 A1 | 6/2015 | Szostak et al. | |
| 2015/0180999 A1* | 6/2015 | Pisz | B60K 35/00 709/204 |
| 2017/0070862 A1* | 3/2017 | Buttolo | H04W 4/046 |

FOREIGN PATENT DOCUMENTS

| | | |
|---|---|---|
| JP | 2014078271 A | 5/2014 |
| JP | 2015034919 A | 2/2015 |

OTHER PUBLICATIONS

Cava, M. "Visiting the Future in Mercedes' F 015 Autonomous Car", USA Today, usatoday.com, Mar. 19, 2015, http://www.usatoday.com/story/tech/2015/03/18/mercedes-benz-f015-autonomouscar-first-ride/24964341/, 4 pp.

Degteva, O., "Cars to Become Augmented Reality Gadgets", DegTev, degtev.com, Apr. 11 2015, http://degtev.com/post/cars-to-become-augmented-reality-gadgets, 4 pp.

Quick, D., "GM's Windows of Opportunity Project Turns Car Windows into Interactive Displays", Gizmag, gizmag.com, Jan. 18, 2012, www.gizmag.com/gm-windows-of-opportunity/21154/, 3 pp.

Wang, C., et al., "Automotive Usability: Human Computer Interaction in the Vehicle", Information Technology and Web Science, Rensselaer Polytechnic Institute, Dec. 1, 2012, http://homepages.rpi.edu/~gricer/symposium/papers/Automotive_paper.pdf, 8 pp.

Wood, M., "Video Feature: Inside the F 015, Mercedes's Self-Driving Car", The New York Times, nytimes.com, Mar. 29, 2015, http://www.nytimes.com/2015/03/20/automobiles/video-feature-inside-the-f-015-mercedess-self-driving-car.html?_r=0, 4 pp.

Wu, et al., "A Prototype of Landmark-Based Car Navigation Using a Full-Windshield Head-Up Display System", Proceedings of the 2009 workshop on Ambient media computing. ACM, Jan. 2009, http://www.researchgate.net/profile/Thomas_Seder/publication/234792, 7 pp.

* cited by examiner

CUSTOMIZED IN-VEHICLE DISPLAY INFORMATION

FIELD OF THE DISCLOSURE

The present disclosure is generally related to customized in-vehicle display information.

BACKGROUND

Providing personalized information to an occupant of a vehicle may improve a travel experience. While a vehicle occupant may utilize a personal mobile device to select content for delivery via a wireless communications network, there may be challenges associated with displaying content that is personalized for a particular vehicle occupant at a display location within the vehicle that is different from a display screen of the personal mobile device.

DETAILED DESCRIPTION

Figure 1:
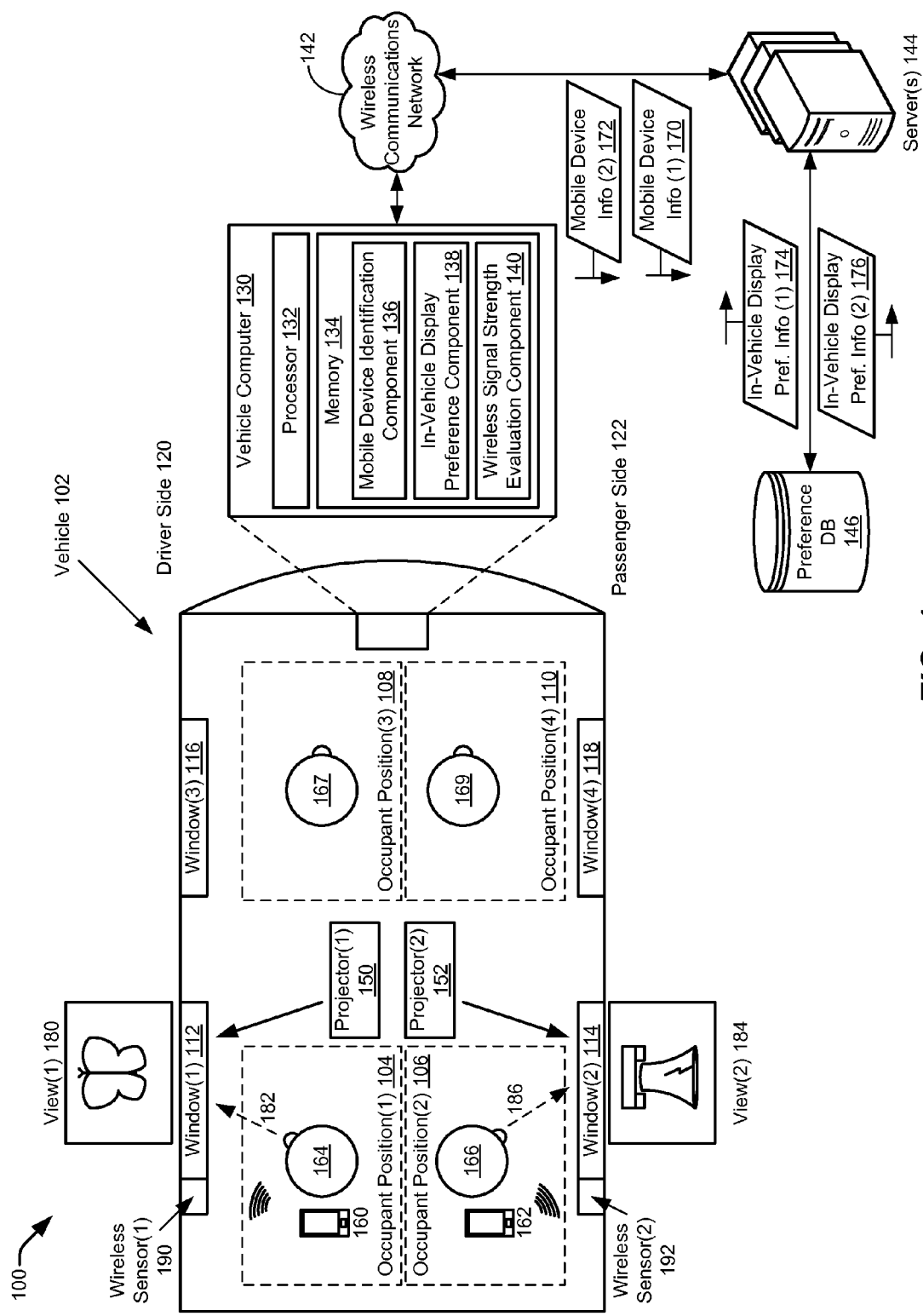
FIG. 1 is a block diagram of an embodiment of a system for customizing in-vehicle display information.

The present disclosure describes systems and methods for customizing display information based on in-vehicle display preference information. A vehicle (e.g., a self-driving car) includes multiple windows that may be used to display different information for vehicle occupants located at different vehicle occupant positions. In some cases, information received from a mobile device of a vehicle occupant may be used to identify a person associated with the mobile device and the in-vehicle display preference information for the identified person. Customizing the display of information for an individual vehicle occupant (or multiple occupants) may provide a more enjoyable and/or educational vehicle experience. While the present disclosure describes customized display of visual information, it will be appreciated that customized audio information may also be selected/presented to a person located at a particular vehicle occupant position. For example, a distributed speaker system (e.g., an array) in a vehicle may emit focused audio to a passenger. As another example, a "smart" audio distribution system may provide a personalized audio stream to a set of headphones used by a particular passenger (e.g., wired or wireless headphones).

As described further herein, a vehicle computer may receive information from one or more mobile devices located within the vehicle. In some cases, the vehicle computer may communicate with a server via a wireless communications network to identify a person associated with a particular mobile device and to determine in-vehicle display preference information for the identified person. Multiple projectors may be located within the vehicle, and the vehicle computer may send data representing display information to one or more of the projectors to project display information that is customized for a particular vehicle occupant based on the in-vehicle display preference information for the particular vehicle occupant. As described further herein, in some cases, different projectors may project different information onto different windows within the vehicle to allow different information to be viewed from different viewing angles. As illustrative, non-limiting examples, a first projector may project first display information that is customized for a first person located at a driver side rear passenger vehicle occupant position onto one or more windows (e.g., a driver side rear passenger window and/or other windows within the vehicle). A second projector may project second display information that is customized for a second person located at a passenger side rear passenger vehicle occupant position onto one or more windows (e.g., a passenger side rear passenger window and/or other windows within the vehicle).

As described further herein, various methods may be used to identify a person and/or vehicle occupant position for a particular mobile device that is located within the vehicle. For example, in some cases, the vehicle computer may use a telephone number and/or social network profile information received from a particular mobile device to identify the particular person associated with the particular mobile device. With respect to identifying a location of the particular mobile device within the vehicle, one or more in-vehicle sensors may be located within the vehicle (in some cases). To illustrate, a particular in-vehicle sensor (e.g., adjacent to a driver/passenger side rear passenger occupant position) may determine whether a wireless signal strength for the particular mobile device satisfies a wireless signal strength threshold to associate the mobile device with a particular vehicle occupant position. In some cases, multiple in-vehicle sensors may be located within the vehicle to measure wireless signal strength at different locations within the vehicle, and the different wireless signal strength values may be compared in order to associate a particular mobile device with a particular vehicle occupant position (e.g., a driver/passenger side rear passenger occupant position). Alternative or additional methods of identifying a person and/or a vehicle occupant position may be used, such as using biometrics or pin codes (among other alternatives).

In some cases, special curvatures and/or polarization may be incorporated into display windows to allow for different displays based on an individual's focal point within the vehicle. As described further herein, in some cases, display information that is projected onto a first window (or windows) may be visible from a first viewing angle (or angles) associated with a first vehicle occupant position but may not be visible from a second viewing angle (or angles) associated with a second vehicle occupant position. As an illustrative, non-limiting example, first display information that is projected onto a driver side rear passenger window (customized based on in-vehicle display preference information for a person located at a driver side rear passenger occupant position) may be visible to a person from the driver side rear passenger occupant position but may not be visible from the passenger side rear passenger occupant position. Similarly, second display information that is projected onto a passenger side rear passenger window (customized based on in-vehicle display preference information for a different person located at a passenger side rear passenger occupant position) may be visible from the passenger side rear passenger occupant position but may not be visible from the driver side rear passenger occupant position.

As described further herein, the system of the present disclosure may utilize multiple "layers" of location information to customize display information for a particular vehicle occupant (or occupants). As an example, different layers of location information may include a location of a vehicle, a location of an individual's mobile device, a location of one individual's mobile device relative to another individual's mobile device, or a combination thereof (among other alternatives). Internet-based (also referred to as "cloud-based") sources of information and/or localized sources of information may be accessible to the vehicle computer. A profile database may store individual preference information, and an analytics engine may determine what information is appropriate to send or to make recommendations based on the individual(s) located within the vehicle. Information may be conveyed via a macro-network approach (e.g., cellular, satellite, etc.) as well as via a near-field approach (e.g., roadside beacon, nearby vehicle, etc.). As an example, audio data, video data, social network information, etc. that is identified for a particular individual based on the individual preference information may be conveyed via a cellular network. As another example, historical information associated with a historical landmark along a vehicle's route may be communicated via a roadside beacon that is located near the historical landmark.

Illustrative, non-limiting examples of display information may include travel information, educational information, public service information, and commercial information (among other alternatives). An example of travel information may include a navigation/map display having alternate route suggestions for an individual located within the vehicle (e.g., avoiding a curvy mountain route for a passenger who may become car sick). Examples of educational information may include historical roadside markers and related information, driving tours through a park including different content feeds based on age/interest, or points of interest along a route. Examples of public service information may include flooded roads and alternative route suggestions, tornado warnings showing direction and intersection of tornado path with vehicle route, or a location and approaching direction of an emergency vehicle. Examples of commercial information may include a list of restaurants that are "acceptable" to each vehicle occupant for upcoming highway exits, or special events or entertainment websites providing background information (e.g., pre-game information for a sporting event that is scheduled to occur at a location along a vehicle route).

Thus, the systems and methods of the present disclosure may enable different persons to be presented with different personally relevant information that is customized based on personal preference, potentially providing a personalized enriched experience for an individual vehicle occupant.

In a particular embodiment, a computer-implemented method includes determining, based on first information received from a first mobile device within a vehicle, that the first mobile device is associated with a first person. The method includes determining first in-vehicle display preference information and a first vehicle occupant position of a plurality of vehicle occupant positions for the first person. The method also includes selecting, based on the first vehicle occupant position, a first projector of a plurality of projectors within the vehicle. The method further includes providing data representing display information to the first projector to enable the first projector to project the display information onto a display associated with a first window of the vehicle. The display information is determined based on the first in-vehicle display preference information for the first person.

In another embodiment, a system includes a processor and a memory accessible to the processor. The memory stores instructions that are executable by the processor to perform various operations. The operations may include determining, based on first information received from a first mobile device within a vehicle, that the first mobile device is associated with a first person. The operations may include determining first in-vehicle display preference information and a first vehicle occupant position of a plurality of vehicle occupant positions for the first person. The operations may include selecting, based on the first vehicle occupant position, a first projector of a plurality of projectors within the vehicle. The operations may include providing first data representing first display information to the first projector to enable the first projector to project the first display information onto a first display associated with a first window of the vehicle, where the first display information is determined based on the first in-vehicle display preference information for the first person. The operations may include determining, based on second information received from a second mobile device within the vehicle, that the second mobile device is associated with a second person. The operations may include determining second in-vehicle display preference information and a second vehicle occupant position of the plurality of vehicle occupant positions for the second person, where the second in-vehicle display preference information is different from the first in-vehicle display preference information. A second projector of the plurality of projectors may be selected based on the second vehicle occupant position. The operations may further include providing second data representing second display information to the second projector to enable the second projector to project the second display information onto a second display associated with a second window of the vehicle. The second display information may be determined based on the second in-vehicle display preference information for the second person, where the second display information is different from the first display information.

In yet another embodiment, a computer-readable storage device may store instructions that, when executed by a processor, cause the processor to perform various operations. The operations may include determining, based on information received from a mobile device within a vehicle, that the mobile device is associated with a particular person. The operations may include determining in-vehicle display preference information and a first rear passenger occupant position for the particular person. The operations may also include selecting, based on the first rear passenger occupant position, a first projector of a plurality of projectors within the vehicle. The operations may further include providing data representing display information to the first projector to enable the first projector to project the display information onto a first display associated with a first window of the vehicle that is adjacent to the first rear passenger occupant position. The first display information may be determined based on the in-vehicle display preference information for the particular person.

Referring to FIG. 1, a diagram 100 illustrates a particular embodiment of a system for customizing display information based on in-vehicle display preference information. In FIG. 1, a vehicle 102 (e.g., a self-driving car) includes multiple windows that may be used to display information that is customized for a vehicle occupant associated with a particular mobile device based on in-vehicle display preference information for the vehicle occupant. Customizing the display of information for a particular vehicle occupant may allow each vehicle occupant to view different information.

FIG. 1 illustrates that the vehicle 102 includes multiple vehicle occupant positions. For example, in the particular embodiment of FIG. 1, the vehicle 102 includes a first vehicle occupant position 104, a second vehicle occupant position 106, a third vehicle occupant position 108, and a fourth vehicle occupant position 110. In alternative embodiments, the vehicle 102 may include an alternative number and/or arrangement of vehicle occupant positions. In the example of FIG. 1, the vehicle 102 includes a first window 112 corresponding to a driver side rear passenger window (adjacent to the first vehicle occupant position 104), a second window 114 corresponding to a passenger side rear passenger window (adjacent to the second vehicle occupant position 104), a third window 116, and a fourth window 118. The third window 116 is located on a driver side 120 of the vehicle 102 (adjacent to the third vehicle occupant position 108), and the fourth window 118 is located on a passenger side 122 of the vehicle 102 (adjacent to the fourth vehicle occupant position 110). In alternative embodiments, the vehicle 102 may include an alternative number and/or arrangement of windows.

FIG. 1 further illustrates that the vehicle 102 includes a vehicle computer 130 comprising a processor 132 and a memory 134 that is accessible to the processor 132. The memory 134 may store instructions that are executable by the processor 132 to perform various operations. In the example of FIG. 1, the memory 134 includes a mobile device identification component 136, an in-vehicle display preference component 138, and a wireless signal strength evaluation component 140. The mobile device identification component 136 is configured to determine, based on information received from a particular mobile device within the vehicle 102, that the particular mobile device is associated with a particular person. The in-vehicle display preference component 138 is configured to determine in-vehicle display preference information for the particular person that is identified by the mobile device identification component 136. In a particular embodiment, the wireless signal strength evaluation component 140 is configured to determine a particular vehicle occupant position of the plurality of vehicle occupant positions (e.g., one of the four vehicle occupant positions 104-110 in the example of FIG. 1) for a particular person, as described further herein. In some cases, the vehicle computer 130 may associated occupant information related to the particular person with the particular vehicle occupant position. Illustrative examples of occupant information related to the particular person may include a name, an identifier, a subscriber number, an account number, a location, or a combination thereof (among other alternatives).

FIG. 1 illustrates that the vehicle computer 130 is configured to communicate via a wireless communications network 142. In the example of FIG. 1, the vehicle computer 130 is configured to communicate with a server 144 (or multiple servers) via the wireless communications network 142. As further described herein, a preference database 146 may be accessible to the server 144, and the preference database 146 may store in-vehicle display preference information for different persons associated with different mobile devices.

FIG. 1 further illustrates that a plurality of projectors are located within the vehicle 102, including at least a first projector 150 and a second projector 152. In other cases, the vehicle 102 may include an alternative number and/or arrangement of projectors. The vehicle computer 130 is configured to communicate data representing display information to a particular projector (or multiple projectors, as described further herein). In some cases, the vehicle computer 130 is configured to communicate with the first projector 150 and/or the second projector 152 via a wireless connection, a wired connection, or a combination thereof.

As further described herein, the first projector 150 is configured to project display information onto a display associated with a window (or windows) of the vehicle 102, and the second projector 152 is configured to project display information onto a display associated with another window (or windows) of the vehicle 102. FIG. 1 depicts a non-limiting, illustrative example in which the first projector 150 is configured to project first display information onto a first display associated with the first window 112 (adjacent to the first vehicle occupant position 104), and the second projector 152 is configured to project second display information onto a second display associated with the second window 114. As illustrated and further described herein with respect to FIGS. 2 and 3, the first projector 150 and/or the second projector 152 may be configured to project display information onto more than one window within the vehicle 102. As described further herein, the vehicle computer 130 may determine particular display information to be projected by the first projector 150 and/or the second projector 152 based on in-vehicle display preference information for a particular person (or persons) within the vehicle 102. In some cases, the vehicle computer 130 may further determine the particular information based on a location of the vehicle 102 (e.g., based on proximity to a historical landmark, a tourist attraction, etc.), a location of the mobile device of the person within the vehicle 102 (e.g., whether the person is adjacent to a window with a view of the historical landmark, the tourist attraction, etc.), a location of the vehicle 102 relative to another vehicle (not shown in FIG. 1), or a combination thereof (among other alternatives).

FIG. 1 depicts a non-limiting, illustrative example in which a first mobile device 160 and a second mobile device 162 are located within the vehicle 102. The first mobile device 160 may be associated with a first person 164, and the second mobile device 162 may be associated with a second person 166. FIG. 1 further illustrates a third person 167 (a driver of the vehicle 102) and a fourth person 169 (a front passenger). In some cases, one or more other mobile devices (e.g., a mobile device associated with the third person 167, the fourth person 169, etc.) may be located at one or more other locations within the vehicle 102. Further, while not shown in the example of FIG. 1, in some cases (e.g., when the vehicle 102 is not being driven or is in a self-driving mode in the case of a self-driving vehicle), customized information may also be projected for the third person 167 and/or the fourth person 169 (e.g., on the windshield, the third window 116, the fourth window 118, etc.)

In operation, the vehicle computer 130 may receive first information 170 (identified as "Mobile Device Info(1)" in FIG. 1) from the first mobile device 160. The mobile device identification component 136 of the vehicle computer 130 may determine, based on the first information 170, that the first mobile device 160 is associated with the first person 164. As an example, the first information 170 may include an identifier (e.g., a telephone number or a media access control (MAC) address) associated with the first mobile device 160 that may be received at the vehicle computer 130 from the first mobile device 160. To illustrate, the telephone number may be received from the first mobile device 160 in a hands-free phone operating mode or from a mobile device application designed for communication between the first mobile device 160 and the vehicle computer 130 (among other alternatives). A MAC address may be utilized for wireless communications between the first mobile device 160 and the vehicle computer 130 in the case of a wireless local area network (LAN) for Internet access via the first mobile device 160 within the vehicle 102. As another example, the first information 170 may include social network profile information (e.g., a link to a social media page, login information, etc.) that may be provided by the first person 164 via an interface (e.g., a touch-screen display) associated with the vehicle computer 130. In the example illustrated in FIG. 1, the mobile device identification component 136 may send the first information 170 to the server 144 via the wireless communications network 142, and the server 144 may identify the first mobile device 160 as being associated with the first person 164 (e.g., based on the telephone number or the social network profile information). For example, the server 144 may be associated with an operator of the wireless communications network 142, and the operator may store customer information for multiple mobile devices (including the first mobile device 160). Alternatively, mobile device data may be stored at a storage device that is located within the vehicle 102 (e.g., at the memory 134), and the mobile device identification component 136 may determine that the first mobile device 160 is associated with the first person 164 based on the mobile device data stored at the memory 134.

The in-vehicle display preference component 138 may determine the first in-vehicle display preference information 174 for the first person 164. The vehicle computer 130 may associate first occupant information related to the first person 164 with the first vehicle occupant position 104, select the first projector 150 based on the first vehicle occupant position 104, and provide data representing display information to the first projector 150. FIG. 1 illustrates that the data may enable the first projector 150 to project the display information onto a display associated with the first window 112 of the vehicle 102. In the example of FIG. 1, the projected display information may correspond to a first view 180 (identified as "View(1)" in FIG. 1) that may be visible from a first viewing angle 182 (associated with the first vehicle occupant position 104). FIG. 1 illustrates an example in which the first view 180 corresponds to a view of nature (e.g., a butterfly). The view of nature may represent a customized view for the first person 164 based on the in-vehicle preference information 174 for the first person 164 indicating that the first person 164 may be interested in nature.

FIG. 1 further illustrates that the vehicle computer 130 may receive second information 172 (identified as "Mobile Device Info(2)" in FIG. 1) from the second mobile device 162. As an example, the second information 172 may include an identifier (e.g., a telephone number or a MAC address) associated with the second mobile device 162 that may be received at the vehicle computer 130 from the second mobile device 162. To illustrate, the telephone number may be received from the second mobile device 162 in a hands-free phone operating mode or from a mobile device application designed for communication between the second mobile device 162 and the vehicle computer 130 (among other alternatives). A MAC address may be utilized for wireless communications between the second mobile device 162 and the vehicle computer 130 in the case of a wireless LAN within the vehicle 102. As another example, the second information 172 may include social network profile information (e.g., a link to a social media page, login information, etc.) that may be provided by the second person 166 via an interface (e.g., a touch-screen display) associated with the vehicle computer 130. The mobile device identification component 136 of the vehicle computer 130 may determine, based on the second information 172, that the second mobile device 162 is associated with the second person 166. In the example illustrated in FIG. 1, the mobile device identification component 136 may send the second information 172 to the server 144, and the server 144 may identify the second mobile device 162 as being associated with the second person 166. For example, the server 144 may be associated with an operator of the wireless communications network 142, and the operator may store customer information for multiple mobile devices (including the second mobile device 162). Alternatively, the vehicle computer 130 may store mobile device data at the memory 134, and the mobile device identification component 136 may determine that the second mobile device 162 is associated with the second person 166 based on the mobile device data stored at the memory 134.

The in-vehicle display preference component 138 may determine the second in-vehicle display preference information 176 for the second person 166. The vehicle computer 130 may associate second occupant information related to the second person 166 with the second vehicle occupant position 106, select the second projector 152 based on the second vehicle occupant position 106, and provide data representing display information to the second projector 152. FIG. 1 illustrates that the data may enable the second projector 152 to project the display information onto a display associated with the second window 114 of the vehicle 102. In the example of FIG. 1, the projected display information may correspond to a second view 184 (identified as "View(2)" in FIG. 1) that may be visible from a second viewing angle 186 (associated with the second vehicle occupant position 106). FIG. 1 illustrates an example in which the second view 184 corresponds to a view of historical information. The view of historical information may represent a customized view for the second person 166 based on the in-vehicle preference information 176 for the second person 166 indicating that the second person 166 may be interested in history, as an example.

In the example of FIG. 1, the first projector 150 projects the first display information onto the first window 112 (the driver side rear passenger window), and the first display information is visible from the first occupant position 104 (the driver side rear passenger occupant position). For example, the first view 180 may be visible to the first person 164 from the first viewing angle 182. In some cases, the first view 180 may not be visible from the second occupant position 106 (the passenger side rear passenger occupant position). FIG. 1 further illustrates that the second projector 152 projects the second display information onto the second window 114 (the passenger side rear passenger window), and the second display information is visible from the second occupant position 106 (the passenger side rear passenger occupant position). For example, the second view 184 may be visible to the second person 166 from the second viewing angle 186. In some cases, the second view 184 may not be visible from the first occupant position 104 (the driver side rear passenger occupant position).

While FIG. 1 illustrates an example in which the first view 180 corresponds to a view of nature and the second view 184 corresponds to a view of historical information, other examples of different views include age appropriate views (e.g., child vs. adult), upcoming restaurants having a particular style of food, or information about animals for a child interested in animals, among other alternatives. In some cases, customized content may include user-initiated content (e.g., a game), system-initiated content (e.g., advertisements), or a combination thereof. As an illustrative example, in the case of upcoming restaurants having a particular style of food, one or more windows on the driver side 120 of the vehicle 102 may be selected for display of information regarding one or more restaurants on the driver side 120 of a vehicle route, one or more windows on the passenger side 122 of the vehicle 102 may be selected for display of information regarding one or restaurants on the passenger side 122 of the vehicle route, or a combination thereof. As another illustrative example, in the case of targeted advertisements, an advertisement targeted to a child may be displayed at a window (or windows) adjacent to a child's vehicle occupant position, and a different advertisement targeted to an adult may be displayed at a window (or windows) adjacent to an adult's vehicle occupant position.

FIG. 1 illustrates a particular embodiment in which the vehicle 102 includes a plurality of in-vehicle sensors, including at least a first in-vehicle sensor 190 (identified as "Wireless Sensor(1)" in FIG. 1) and a second in-vehicle sensor 192 (identified as "Wireless Sensor(2)" in FIG. 1). The first in-vehicle sensor 190 may be associated with the first vehicle occupant position 104, and the second in-vehicle sensor 192 may be associated with the second vehicle occupant position 106. The first in-vehicle sensor 190 may measure a first wireless signal strength (associated with the first vehicle occupant position 104) and communicate the first wireless signal strength to the vehicle computer 130 for evaluation by the wireless signal strength evaluation component 140. The second in-vehicle sensor 192 may measure a second wireless signal strength (associated with the second vehicle occupant position 106) and communicate the second wireless signal strength to the vehicle computer 130 for evaluation by the wireless signal strength evaluation component 140.

In some cases, the wireless signal strength evaluation component 140 may determine whether a measured wireless signal strength satisfies a particular wireless signal strength threshold. As an example, the wireless signal strength evaluation component 140 may determine that the first wireless signal strength (measured by the first in-vehicle sensor 190) satisfies a wireless signal strength threshold for associating a particular mobile device (e.g., the first mobile device 160 in the example of FIG. 1) with the first vehicle occupant position 104. As another example, the wireless signal strength evaluation component 140 may determine that the second wireless signal strength (measured by the second in-vehicle sensor 192) satisfies a wireless signal strength threshold for associating a particular mobile device (e.g., the second mobile device 162 in the example of FIG. 1) with the second vehicle occupant position 106.

In the example of FIG. 1, multiple mobile devices (e.g., the first mobile device 160 and the second mobile device 162) are located within the vehicle 102. Accordingly, the wireless signal strength evaluation component 140 may associate a particular mobile device with a particular vehicle occupant position based on a comparison of multiple wireless signal strength values for individual mobile devices that are measured by individual in-vehicle sensors. As an example, the first in-vehicle sensor 190 may measure a first wireless signal strength for the first mobile device 160, and the second in-vehicle sensor 192 may measure a second wireless signal for the first mobile device 160. The wireless signal strength evaluation component 140 may determine, based on a comparison of the first wireless signal strength and the second wireless signal strength, that the first wireless signal strength for the first mobile device 160 (measured by the first in-vehicle sensor 190) exceeds the second wireless signal strength for the first mobile device 160 (measured by the second in-vehicle sensor 192). Based on the comparison, the vehicle computer 130 may associate the first mobile device 160 with the first vehicle occupant position 104. As another example, the first in-vehicle sensor 190 may measure a first wireless signal strength for the second mobile device 162, and the second in-vehicle sensor 192 may measure a second wireless signal strength for the second mobile device 162. The wireless signal strength evaluation component 140 may determine, based on a comparison of the first wireless signal strength and the second wireless signal strength, that the second wireless signal strength for the second mobile device 162 (measured by the second in-vehicle sensor 192) exceeds the first wireless signal strength for the second mobile device 162 (measured by the first in-vehicle sensor 190). Based on the comparison, the vehicle computer 130 may associate the second mobile device 162 with the second vehicle occupant position 106.

Thus, FIG. 1 illustrates an example of a system of displaying customized information based on in-vehicle display preference information. In the example of FIG. 1, multiple mobile devices are located within the vehicle, and different display information may be selected for projection onto different windows based on in-vehicle display preference information for a particular user associated with a particular mobile device. As described further herein with respect to FIGS. 2 and 3, different display information may be selected for projection onto different windows of the vehicle that may be visible from a particular vehicle occupant position.

Figure 2:
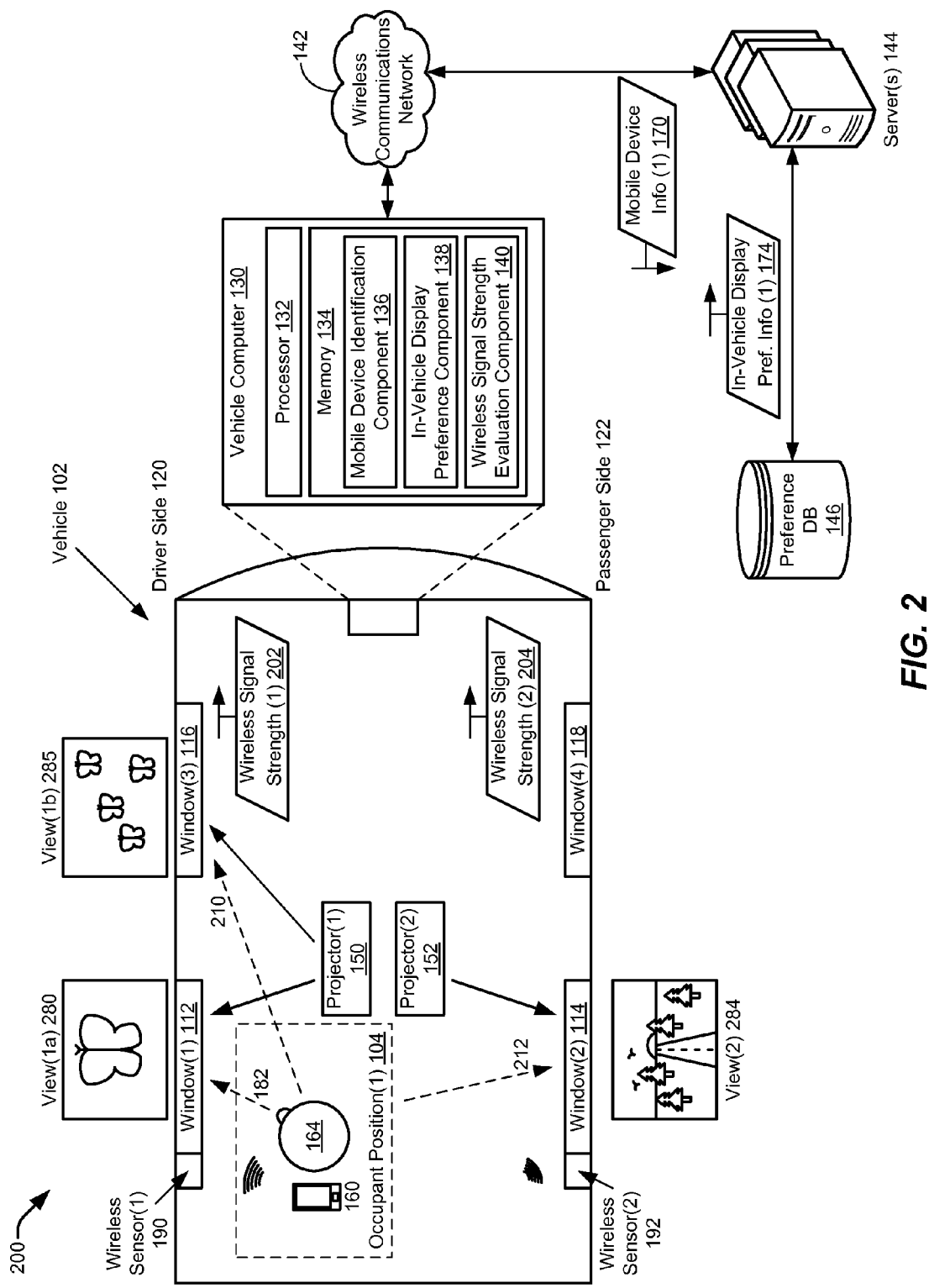
FIG. 2 is a block diagram of an embodiment of a system for customizing in-vehicle display information.
Figure 3:
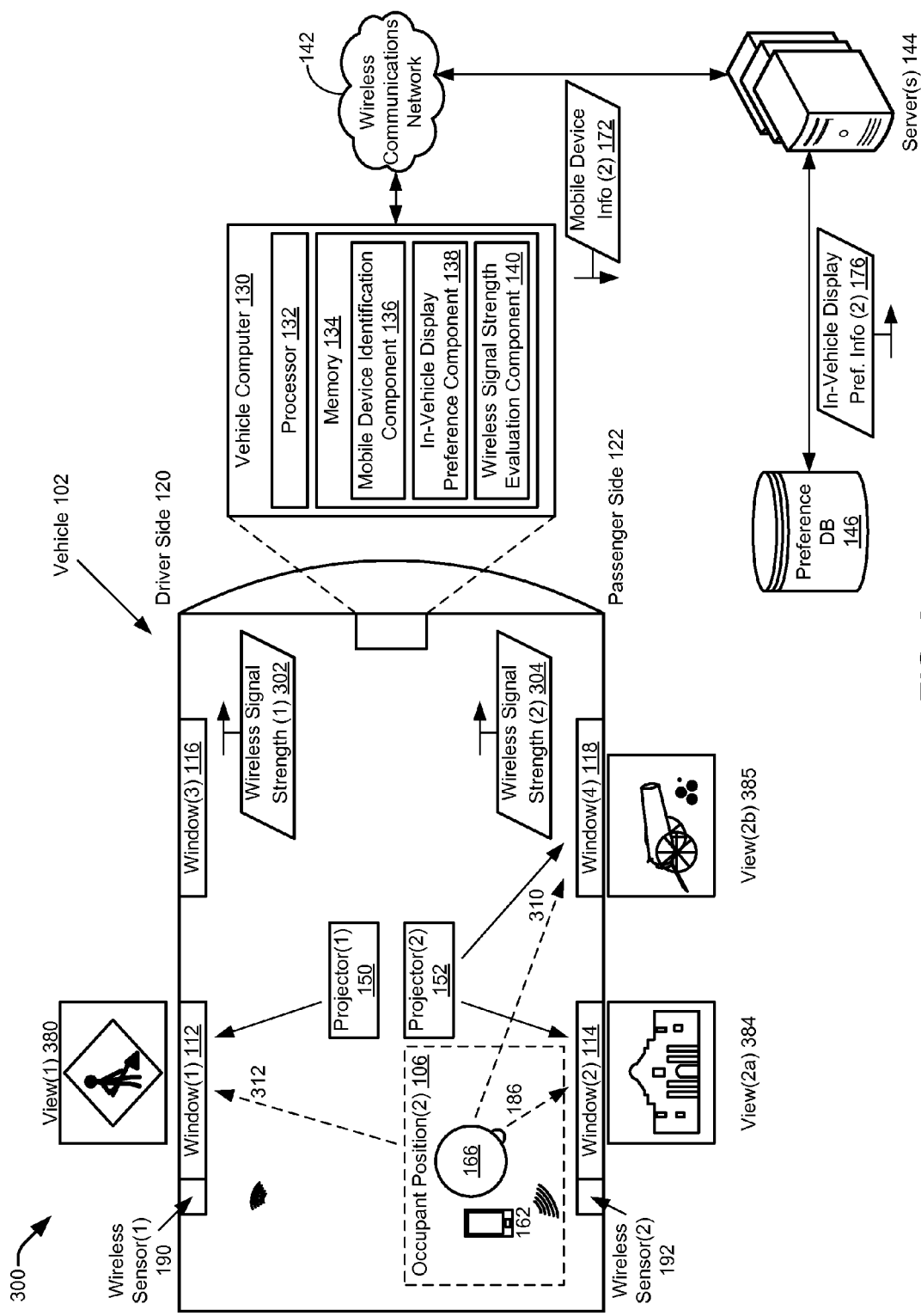
FIG. 3 is a block diagram of an embodiment of a system for customizing in-vehicle display information.

Referring to FIG. 2, a diagram 200 illustrates a particular embodiment of a system for customizing in-vehicle display information. In the example of FIG. 2, different windows in the vehicle 102 may be used to display different information that may be visible to a particular person from a particular vehicle occupant position (e.g., a driver side rear passenger occupant position). The information selected for display at the windows may be customized for a vehicle occupant associated with a particular mobile device based on in-vehicle display preference information for the vehicle occupant. Customizing the display of information for a particular vehicle occupant may provide a personalized experience for the particular vehicle occupant (e.g., the driver side rear passenger occupant in the example of FIG. 2). FIG. 2 illustrates an example of a personalized experience for an occupant that is interested in nature, while FIG. 3 illustrates an example for an occupant that is interested in history.

In the particular embodiment illustrated in FIG. 2, the first person 164 is illustrated as being located at the first vehicle occupant position 104 (the driver side rear passenger occupant position). FIG. 2 illustrates that the first window 112 may be used to display a first view 280 (identified as "View(1a)" in FIG. 2), the second window 114 may be used to display a second view 284 (identified as "View(2)" in FIG. 2), and the third window 116 may be used to display a third view 285 (identified as "View(1b)" in FIG. 2). In FIG. 2, the first projector 150 may be selected to project first display information associated with the first view 280 onto the first window 112, and the second projector 152 may be selected to project second display information associated with the second view 284 onto the second window 114. While FIG. 2 illustrates that the first projector 150 may be used to project third display information associated with the third view 285 onto the third window 116, in alternative embodiments, a different projector may be located within the vehicle 102.

FIG. 2 illustrates that, in operation, the vehicle computer 130 may receive the first information 170 (identified as "Mobile Device Info(1)" in FIG. 2) from the first mobile device 160. The mobile device identification component 136 may determine, based on the first information 170, that the first mobile device 160 is associated with the first person 164. FIG. 2 further illustrates that the in-vehicle display preference component 138 may determine the first in-vehicle display preference information 174 for the first person 164, and the vehicle computer 130 may determine the first vehicle occupant position 104 for the first person 164. In some cases, the vehicle computer 130 may associate first occupant information related to the first person 164 (e.g., name, identifier, subscriber number, account number, location, etc.) with the first vehicle occupant position 104. The vehicle computer 130 may select the first projector 150 and the second projector 152 based on the first vehicle occupant position 104, and the vehicle computer 130 may provide data representing the first display information to the first projector 150 (for projection onto a display associated with the first window 112), data representing the second display information to the second projector 152 (for projection onto a display associated with the second window 114), and data representing the third display information to the first projector 150 (for projection onto a display associated with the third window 116).

FIG. 2 illustrates that the first view 280 may be visible from the first viewing angle 182 (associated with the first vehicle occupant position 104), the second view 284 may be visible from a second viewing angle 212 (associated with the first vehicle occupant position 104), and the third view 285 may be visible from a third viewing angle 210 (associated with the first vehicle occupant position 104). FIG. 2 illustrates an example in which the first view 280 corresponds to a first view of nature (e.g., a single butterfly), the second view 284 corresponds to a second view of nature (e.g., multiple butterflies), and the third view 285 corresponds to a third view of nature (e.g., a scenic highway through a forest). The views of nature may represent customized views for the first person 164 based on the in-vehicle preference information 174 for the first person 164 indicating that the first person 164 may be interested in nature but may not be interested in history, as an example.

In a particular embodiment, the wireless signal strength evaluation component 140 may associate the first mobile device 160 with the first vehicle occupant position 104 based on a comparison of a first wireless signal strength 202 measured by the first in-vehicle sensor 190 and a second wireless signal strength 204 measured by the second in-vehicle sensor 192. The wireless signal strength evaluation component 140 may determine, based on a comparison of the first wireless signal strength 202 and the second wireless signal strength 204, that the first wireless signal strength 202 exceeds the second wireless signal strength 204. Based on the comparison, the vehicle computer 130 may associate the first mobile device 160 with the first vehicle occupant position 104.

Thus, FIG. 2 illustrates an example of a system of displaying customized information based on in-vehicle display preference information. In the example of FIG. 2, different display information may be selected for projection onto different windows based on in-vehicle display preference information for a particular user associated with a particular mobile device. FIG. 2 illustrates that the different display information selected for projection onto different windows of the vehicle may be visible from a particular vehicle occupant position (e.g., the driver side rear passenger occupant position).

Referring to FIG. 3, a diagram 300 illustrates a particular embodiment of a system for customizing in-vehicle display information. In the example of FIG. 3, different windows in the vehicle 102 may be used to display different information that may be visible to a particular person from a particular vehicle occupant position (e.g., a passenger side rear passenger occupant position). The information selected for display at the windows may be customized for a vehicle occupant associated with a particular mobile device based on in-vehicle display preference information for the vehicle occupant. Customizing the display of information for a particular vehicle occupant may provide a personalized experience for the particular vehicle occupant (e.g., the passenger side rear passenger occupant in the example of FIG. 3). In contrast to the example illustrated in FIG. 2 for an occupant that is interested in nature, FIG. 3 illustrates an example for an occupant that is interested in history.

In the particular embodiment illustrated in FIG. 3, the second person 166 is illustrated as being located at the second vehicle occupant position 106 (the passenger side rear passenger occupant position). FIG. 3 illustrates that the first window 112 may be used to display a first view 380 (identified as "View(1)" in FIG. 3), the second window 114 may be used to display a second view 384 (identified as "View(2a)" in FIG. 3), and the fourth window 118 may be used to display a third view 385 (identified as "View(2b)" in FIG. 3). In FIG. 3, the first projector 150 may be selected to project first display information associated with the first view 380 onto the first window 112, and the second projector 152 may be selected to project second display information associated with the second view 384 onto the second window 114. While FIG. 3 illustrates that the second projector 152 may be used to project third display information associated with the third view 385 onto the fourth window 118, in alternative embodiments, a different projector may be located within the vehicle 102.

FIG. 3 illustrates that, in operation, the vehicle computer 130 may receive the second information 172 (identified as "Mobile Device Info(2)" in FIG. 3) from the second mobile device 162. The mobile device identification component 136 may determine, based on the second information 172, that the second mobile device 162 is associated with the second person 166. FIG. 3 further illustrates that the in-vehicle display preference component 138 may determine the second in-vehicle display preference information 176 for the second person 166, and the vehicle computer 130 may determine the second vehicle occupant position 106 for the second person 166. In some cases, and the vehicle computer 130 may associate second occupant information related to the second person 166 (e.g., name, identifier, subscriber number, account number, location, etc.) with the second vehicle occupant position 106. The vehicle computer 130 may select the first projector 150 and the second projector 152 based on the second vehicle occupant position 106, and the vehicle computer 130 may provide data representing the first display information to the first projector 150 (for projection onto a display associated with the first window 112), data representing the second display information to the second projector 152 (for projection onto a display associated with the second window 114), and data representing the third display information to the second projector 152 (for projection onto a display associated with the fourth window 118).

FIG. 3 illustrates that the first view 380 may be visible from a first viewing angle 312 (associated with the second vehicle occupant position 106), the second view 384 may be visible from the second viewing angle 186 (associated with the second vehicle occupant position 106), and the third view 385 may be visible from a third viewing angle 310 (associated with the second vehicle occupant position 106). FIG. 3 illustrates an example in which the first view 380 corresponds to road/traffic/navigation/emergency information (e.g., a construction worker to indicate road work ahead), the second view 384 corresponds to a view of historical information (e.g., a first historical building), and the third view 385 corresponds to a different view (e.g., a second historical building). The views may represent customized views for the second person 166 based on the in-vehicle preference information 176 for the second person 166 indicating that the second person 166 may be interested in road/traffic/navigation/emergency information and history, as examples.

In a particular embodiment, the wireless signal strength evaluation component 140 may associate the second mobile device 162 with the second vehicle occupant position 106 based on a comparison of a first wireless signal strength 302 measured by the first in-vehicle sensor 190 and a second wireless signal strength 304 measured by the second in-vehicle sensor 192. The wireless signal strength evaluation component 140 may determine, based on a comparison of the first wireless signal strength 302 and the second wireless signal strength 304, that the second wireless signal strength 304 exceeds the first wireless signal strength 302. Based on the comparison, the vehicle computer 130 may associate the second mobile device 162 with the second vehicle occupant position 106.

Thus, FIG. 3 illustrates an example of a system of displaying customized information based on in-vehicle display preference information. In the example of FIG. 3, different display information may be selected for projection onto different windows based on in-vehicle display preference information for a particular user associated with a particular mobile device. FIG. 3 illustrates that the different display information selected for projection onto different windows of the vehicle may be visible from a particular vehicle occupant position (e.g., the passenger side rear passenger occupant position).

Figure 4:
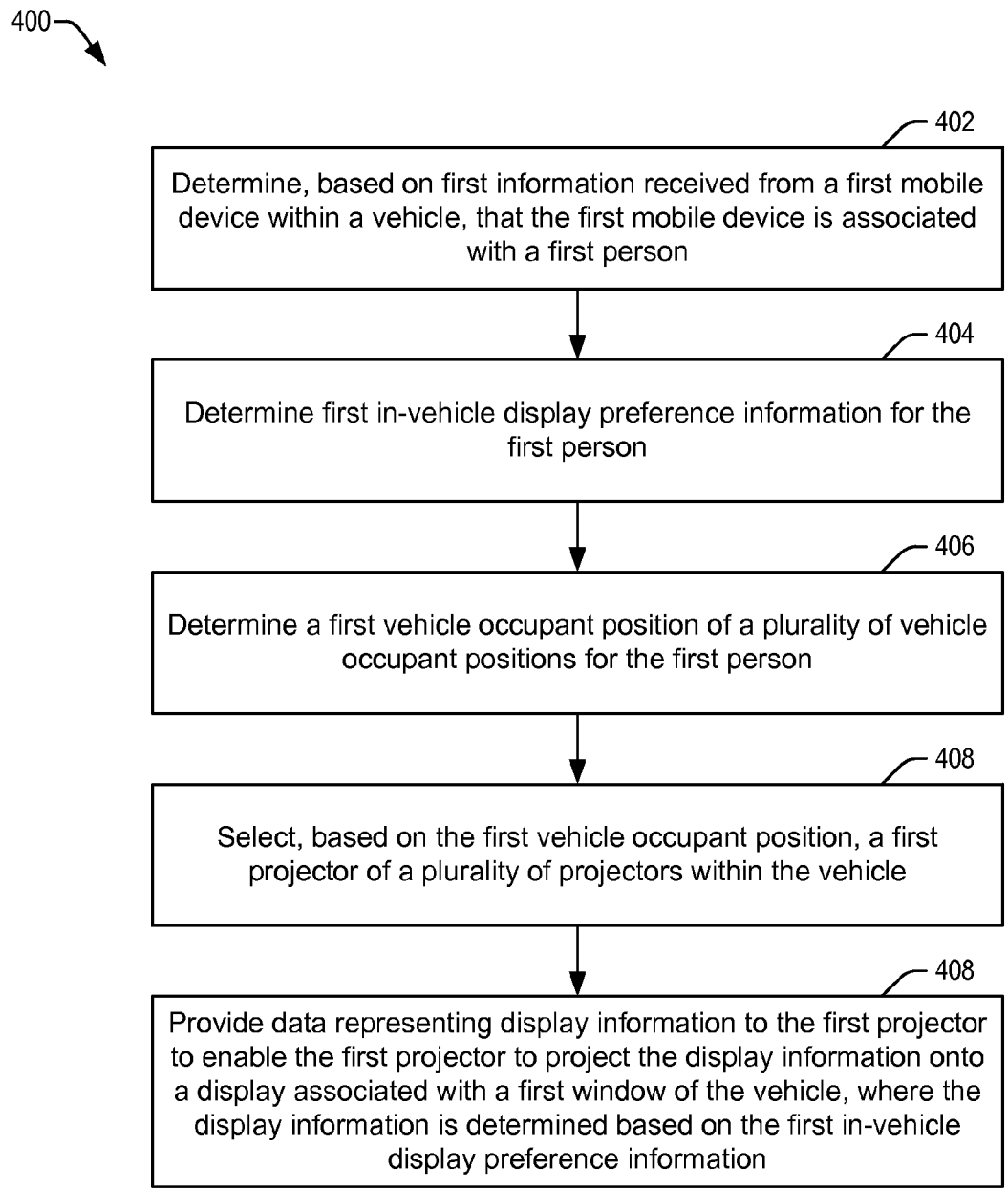
FIG. 4 is a flowchart of an illustrative embodiment of a method of customizing in-vehicle display information.

Referring to FIG. 4, a particular embodiment of a method of displaying customized information based on in-vehicle display preference information is illustrated and is generally designated 400.

The method 400 may include determining, based on first information received from a first mobile device within a vehicle, that the first mobile device is associated with a first person, at 402. For example, referring to FIGS. 1 and 2, the vehicle computer 130 may determine, based on first information (e.g., a first telephone number, first social network profile information, etc.) received from the first mobile device 160 within the vehicle 102, that the first mobile device 160 is associated with the first person 164. As described further herein with respect to FIG. 1, in some cases, the mobile device identification component 136 of the vehicle computer 130 may send the first mobile device information 170 to the server(s) 144 via the wireless communication network 142 in order to identify the first mobile device 160. As another example, referring to FIGS. 1 and 3, the vehicle computer 130 may determine, based on second information (e.g., a second telephone number, second social network profile information, etc.) received from the second mobile device 162 within the vehicle 102, that the second mobile device 162 is associated with the second person 166. As described further herein with respect to FIG. 1, in some cases, the mobile device identification component 136 of the vehicle computer 130 may send the second mobile device information 172 to the server(s) 144 to identify the second mobile device 162.

The method 400 may include determining first in-vehicle display preference information for the first person, at 404. For example, referring to FIGS. 1 and 2, the vehicle computer 130 may determine the first in-vehicle display preference information 174 for the first person 164. As described further herein with respect to FIG. 1, in some cases, the in-vehicle display preference component 138 may receive the first in-vehicle display preference information 174 from the server(s) 144 via the wireless communication network 142. As another example, referring to FIGS. 1 and 3, the vehicle computer 130 may determine the second in-vehicle display preference information 172 for the second person 166. As described further herein with respect to FIG. 1, in some cases, the in-vehicle display preference component 138 may receive the second in-vehicle display preference information 176 from the server(s) 144 via the wireless communication network 142.

The method 400 may include determining a first vehicle occupant position of a plurality of vehicle occupant positions for the first person, at 406. For example, referring to FIGS. 1 and 2, the vehicle computer 130 may determine that the vehicle occupant position for the first person 164 corresponds to the first vehicle occupant position 104 (e.g., a first rear passenger occupant position). As another example, referring to FIGS. 1 and 3, the vehicle computer 130 may determine that the vehicle occupant position for the second person 166 corresponds to the second vehicle occupant position 106 (e.g., a second rear passenger occupant position).

The method 400 may include selecting, based on the first vehicle occupant position, a first projector of a plurality of projectors within the vehicle, at 408. For example, referring to FIGS. 1 and 2, the vehicle computer 130 may select, based on the first vehicle occupant position 104, the first projector 150 within the vehicle 102. As another example, referring to FIGS. 1 and 3, the vehicle computer 130 may select, based on the second vehicle occupant position 106, the second projector 152 within the vehicle 102.

The method 400 may include providing data representing display information to the first projector to enable the first projector to project the display information onto a display associated with a first window of the vehicle, at 410. The display information may be determined based on the first in-vehicle display preference information for the first person.

For example, referring to FIG. 1, the vehicle computer 130 may provide first data representing first display information to the first projector 150 to enable the first projector 150 to project the first display information onto a display associated with the first window 112 of the vehicle 102 (shown as the first view 180 in FIG. 1). As described further herein with respect to FIG. 1, the first display information may be determined based on the first in-vehicle display preference information 174 associated with the first person 164. As another example, referring to FIG. 1, the vehicle computer 130 may provide second data representing second display information to the second projector 152 to enable the second projector 152 to project the second display information onto a display associated with the second window 114 of the vehicle 102 (shown as the second view 184 in FIG. 1). As described further herein with respect to FIG. 1, the second display information may be determined based on the second in-vehicle display preference information 176 associated with the second person 166.

As a further example, referring to FIG. 2, the vehicle computer 130 may provide first data representing first display information to the first projector 150 to enable the first projector 150 to project the first display information onto a display associated with the first window 112 of the vehicle 102 (shown as View(1a) 280 in FIG. 2). Further, the vehicle computer 130 may provide second data representing second display information to the first projector 150 to enable the first projector 150 to project the second display information onto a display associated with the third window 116 of the vehicle 102 (shown as View(1b) 281 in FIG. 2). Additionally, the vehicle computer 130 may provide third data representing third display information to the second projector 152 to enable the second projector 152 to project the third display information onto a display associated with the second window 114 of the vehicle 102 (shown as View(2) 284 in FIG. 2). As described further herein with respect to FIG. 2, the display information for a particular display/window may be determined based on the first in-vehicle display preference information 174 associated with the first person 164.

As yet another example, referring to FIG. 3, the vehicle computer 130 may provide first data representing first display information to the second projector 152 to enable the second projector 152 to project the first display information onto a display associated with the second window 114 of the vehicle 102 (shown as View(2a) 384 in FIG. 3). Further, the vehicle computer 130 may provide second data representing second display information to the second projector 152 to enable the second projector 152 to project the second display information onto a display associated with the fourth window 118 of the vehicle 102 (shown as View(2b) 281 in FIG. 3). Additionally, the vehicle computer 130 may provide third data representing third display information to the first projector 150 to enable the first projector 150 to project the third display information onto a display associated with the first window 112 of the vehicle 102 (shown as View(1) 380 in FIG. 3). As described further herein with respect to FIG. 3, the display information for a particular display/window may be determined based on the second in-vehicle display preference information 176 associated with the second person 166.

Thus, FIG. 4 illustrates an example of a method of displaying customized information based on in-vehicle display preference information (for one or more persons at one or more vehicle occupant positions within the vehicle.

Figure 5:
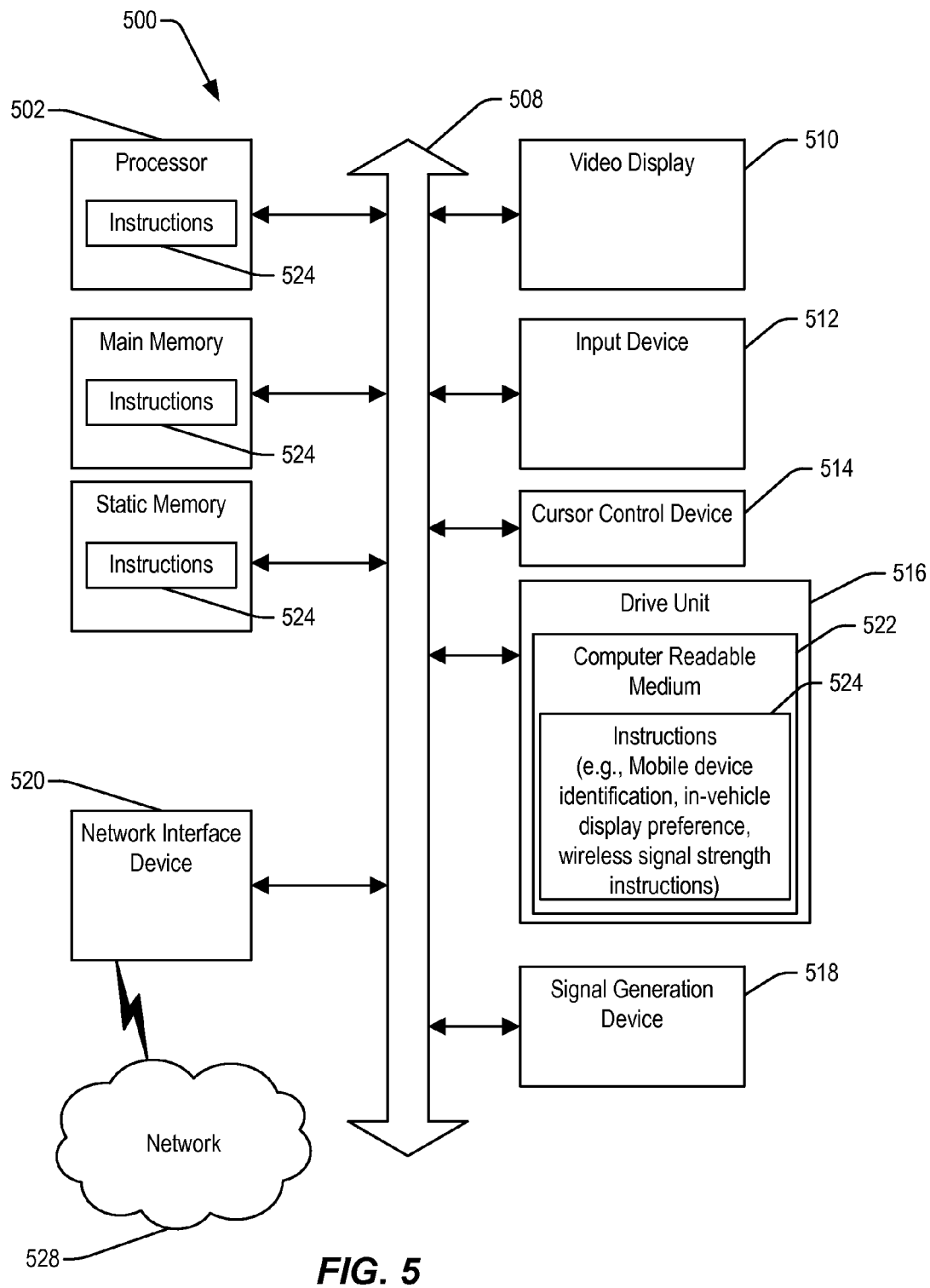
FIG. 5 is a block diagram of an illustrative embodiment of a general computer system.

Referring to FIG. 5, an illustrative embodiment of a general computer system is shown and is designated 500. The computer system 500 includes a set of instructions that can be executed to cause the computer system 500 to perform any one or more of the methods or computer based functions disclosed herein. The computer system 500 may operate as a standalone device or may be connected, e.g., using a network, to other computer systems or peripheral devices. For example, the computer system 500 may include or be included within any one or more of the vehicle computer 130 or the server(s) 144 of FIGS. 1-3.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular embodiment, the computer system 500 may be implemented using electronic devices that provide video, audio, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. For example, the processor 502 may include or correspond to the processor 132 of the vehicle computer 130 of FIGS. 1-3 or a processor of the server(s) 144 of FIGS. 1-3. Moreover, the computer system 500 may include a main memory 504 and a static memory 506, which can communicate with each other via a bus 508. For example, the main memory 504 may include or correspond to the memory 134 of the vehicle computer 130 of FIGS. 1-3 or a memory of the server(s) 144 of FIGS. 1-3.

As shown, the computer system 500 may further include a video display unit 510, such as a liquid crystal display (LCD), a light emitting diode (LED) display, a touch screen display, a flat panel display, or a solid state display. Additionally, the computer system 500 may include an input device 512, such as a remote control device or a keyboard, and a cursor control device 514, such as a mouse. In some embodiments, the input device 512 and the cursor control device 514 may be integrated into a single device, such as a capacitive touch screen input device. The computer system 500 may also include a signal generation device 518, such as a speaker, and a network interface device 520. Some computer systems 500 may not include an input device (e.g., a server may not include an input device).

In a particular embodiment, as depicted in FIG. 5, the device 500 may include computer-readable storage 522 in which one or more sets of instructions 524, e.g. software, can be embedded. The computer-readable storage 522 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 524 may embody one or more of the methods or logic as described herein. The instructions 524 may be executable by the processor 502 to perform one or more functions or methods described herein, such as the method 400 described with reference to FIG. 4. In a particular embodiment, the instructions 524 may reside completely, or at least partially, within the main memory 504, the static memory 506, and/or within the processor 502 during execution by the computer system 500. The main memory 504 and the processor 502 also may include a computer-readable storage device.

In a particular embodiment, the instructions 524 may be executable by the processor 502 to determine, based on information received from a mobile device within a vehicle, that the mobile device is associated with a particular person. The instructions 524 may be further executable by the processor 502 to determine in-vehicle display preference information and a particular vehicle occupant position of a plurality of vehicle occupant positions for the particular person. The instructions 524 may be further executable by the processor 502 to select, based on the particular vehicle occupant position, a projector (or multiple projectors) of a plurality of projectors within the vehicle. The instructions 524 may be further executable by the processor 502 to provide data representing display information to the projector(s) to enable the projector(s) to project display information onto a particular display associated with a particular window (or windows) of the vehicle, where the display information may be determined based on in-vehicle display preference information for a particular person (or persons) within the vehicle.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes computer-readable storage 522 that stores instructions 524, so that a device connected to a network 528 may communicate voice, video or data over the network 528. While the computer-readable storage 522 is shown to be a single device, the computer-readable storage 522 may include a single device or multiple devices, such as a centralized or distributed database, and/or associated caches and servers that store one or more sets of instructions. The computer-readable storage 522 is capable of storing a set of instructions for execution by a processor to cause a computer system to perform any one or more of the methods or operations disclosed herein. For example, the computer-readable storage device 522 may store instructions for execution by a processor to cause a computer system to perform the method 400 described with reference to FIG. 4.

In a particular non-limiting, exemplary embodiment, the computer-readable storage 522 may include a solid-state memory such as embedded memory (or a memory card or other package that houses one or more non-volatile read-only memories). Further, the computer-readable storage 522 may be a random access memory or other volatile re-writable memory. Additionally, the computer-readable storage 522 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 500 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method comprising:
    receiving first information from a first mobile device via a first signal;
    selecting a vehicle occupant position from a plurality of vehicle occupant positions based on the first signal;
    selecting, based on the vehicle occupant position, a first projector of a plurality of projectors within a vehicle; and
    providing data representing display information to the first projector, wherein the first projector projects the data onto a display of a first window of the vehicle, wherein the display information is determined based on first in-vehicle display preference information selected based on the first information, wherein the first window is visible from a first viewing angle associated with the vehicle occupant position and a second viewing angle associated with a second vehicle occupant position of the plurality of vehicle occupant positions, wherein the display is configured such that the display information is visible from the first viewing angle, and wherein the display is configured such that the display information is not visible from the second viewing angle.

2. The computer-implemented method of claim 1, further comprising:
    selecting, based on the second vehicle occupant position, a second projector of the plurality of projectors within the vehicle; and
    providing second data representing second display information to the second projector, wherein the second projector projects the second data onto a second display of a second window of the vehicle, wherein the second display information is determined based on second in-vehicle display preference information, wherein the second window is visible from a third viewing angle associated with the vehicle occupant position and a fourth viewing angle associated with the second vehicle occupant position, wherein the second display is configured such that the second display information is visible from the fourth viewing angle, and wherein the second display is configured such that the second display information is not visible from the third viewing angle.

3. The computer-implemented method of claim 2, wherein the vehicle occupant position comprises a first rear passenger occupant position, and wherein the second vehicle occupant position comprises a second rear passenger occupant position.

4. The computer-implemented method of claim 1, further comprising:
    selecting, based on the vehicle occupant position, a second projector of the plurality of projectors within the vehicle; and
    providing second data representing second display information to the second projector, wherein the second projector projects the second data onto a second display of a second window of the vehicle, wherein the second display information is determined based on the first in-vehicle display preference information, wherein the second window is visible from a third viewing angle associated with the vehicle occupant position and a fourth viewing angle associated with the second vehicle occupant position, wherein the second display is configured such that the second display information is visible from the third viewing angle, and wherein the second display is configured such that the second display information is not visible from the fourth viewing angle.

5. The computer-implemented method of claim 1, wherein the first information received from the first mobile device includes a telephone number associated with the first mobile device.

6. The computer-implemented method of claim 1, wherein the first information received from the first mobile device includes social network profile information.

7. The computer-implemented method of claim 1, wherein the vehicle occupant position comprises a driver side rear passenger occupant position adjacent to a driver side rear passenger window, wherein the second vehicle occupant position comprises a passenger side rear passenger occupant position adjacent to a passenger side rear window, and wherein the driver side rear passenger occupant position is adjacent to the passenger side rear passenger occupant position.

8. The computer-implemented method of claim 1, wherein the first in-vehicle display preference information identifies an interest of a user associated with the first mobile device, and wherein the display information is associated with the interest.

9. The computer-implemented method of claim 1, wherein selecting the vehicle occupant position comprises:
    receiving a first wireless signal strength value from a first in-vehicle sensor associated with the vehicle occupant position;
    receiving a second wireless signal strength value from a second in-vehicle sensor associated with the second vehicle occupant position of the plurality of vehicle occupant positions; and
    determining, based on a comparison of the first wireless signal strength value and the second wireless signal strength value, that the first wireless signal strength value exceeds the second wireless signal strength value.

10. The computer-implemented method of claim 1, further comprising:
    sending, via a wireless communications network, a request for the display information; and receiving the display information via the wireless communications network.

11. The computer-implemented method of claim 1, further comprising retrieving the display information from a storage device that is located within the vehicle.

12. The computer-implemented method of claim 1, wherein selecting the vehicle occupant position comprises determining a wireless signal strength of the first signal, wherein the wireless signal strength is measured using a first in-vehicle sensor of a plurality of in-vehicle sensors, the first in-vehicle sensor associated with the vehicle occupant position.

13. The computer-implemented method of claim 12, wherein selecting the vehicle occupant position comprises determining whether the wireless signal strength satisfies a first wireless signal strength threshold, and wherein the vehicle occupant position is selected responsive to the wireless signal strength satisfying the first wireless signal strength threshold.

14. A system comprising:
a plurality of projectors;
a processor communicatively coupled to the plurality of projectors; and
a memory accessible to the processor, the memory comprising instructions executable by the processor to perform operations comprising:
receiving first information from a first mobile device via a first signal;
selecting a vehicle occupant position from a plurality of vehicle occupant positions based on the first signal;
selecting, based on the vehicle occupant position, a first projector of the plurality of projectors within a vehicle; and
providing representing display information to the first projector, wherein the first projector projects the data onto a display of a first window of the vehicle, wherein the display information is determined based on first in-vehicle display preference information selected based on the first information, wherein the first window is visible from a first viewing angle associated with the vehicle occupant position and a second viewing angle associated with a second vehicle occupant position of the plurality of vehicle occupant positions, wherein the display is configured such that the display information is visible from the first viewing angle, and wherein the display is configured such that the display information is not visible from the second viewing angle.

15. The system of claim 14, wherein the operations further comprise:
selecting, based on the second vehicle occupant position, a second projector of the plurality of projectors; and
providing second data representing second display information to the second projector to enable the second projector to project the second display information onto a second display associated with a second window of the vehicle, wherein the second display information is determined based on second in-vehicle display preference information, and wherein the second display information is different from the display information.

16. The system of claim 15, wherein the vehicle occupant position comprises a driver side rear passenger occupant position adjacent to a driver side rear passenger window, and wherein the second vehicle occupant position comprises a passenger side rear passenger occupant position adjacent to a passenger side rear passenger window.

17. The system of claim 16, wherein the second display information projected onto the passenger side rear passenger window is visible from the passenger side rear passenger occupant position, and wherein the second display information is not visible from the driver side rear passenger occupant position.

18. A computer-readable storage device storing instructions that, when executed by a processor, cause the processor to perform operations comprising:
receiving first information from a first mobile device via a first signal;
selecting a particular occupant position from a plurality of vehicle occupant positions based on the first signal;
selecting, based on the particular occupant position, a first projector of a plurality of projectors within a vehicle; and
providing data representing display information to the first projector, wherein the first projector projects the data onto a display of a first window of the vehicle, wherein the display information is determined based on in-vehicle display preference information selected based on the first information, wherein the first window is visible from a first viewing angle associated with the vehicle occupant position and a second viewing angle associated with a second vehicle occupant position of the plurality of vehicle occupant positions, wherein the display is configured such that the display information is visible from the first viewing angle, and wherein the display is configured such that the display information is not visible from the second viewing angle.

19. The computer-readable storage device of claim 18, wherein the particular occupant position corresponds to a driver side rear passenger occupant position, the operations further comprising:
selecting a second projector of the plurality of projectors; and
providing second data representing second display information to the second projector to enable the second projector to project the second display information via a second display associated with a second window of the vehicle that is adjacent to a passenger side rear passenger occupant position, wherein the second display information is determined based on the in-vehicle display preference information.

20. The computer-readable storage device of claim 18, wherein the particular occupant position corresponds to a passenger side rear passenger occupant position, the operations further comprising:
selecting a second projector of the plurality of projectors; and
providing second data representing second display information to the second projector to enable the second projector to project the second display information via a second display associated with a second window of the vehicle that is adjacent to a driver side rear passenger occupant position, wherein the second display information is determined based on the in-vehicle display preference information.

* * * * *